Feb. 3, 1959 H. J. McCREARY 2,872,525

REGISTER-SENDER SYSTEM EMPLOYING MAGNETIC STORAGE

Filed May 21, 1956 4 Sheets-Sheet 1

INVENTOR.
HAROLD J. McCREARY
BY Wm. Walter Owen.
ATTY.

INVENTOR.
HAROLD J. McCREARY
BY Mc Walter Owen
ATTY.

Feb. 3, 1959 H. J. McCREARY 2,872,525

REGISTER-SENDER SYSTEM EMPLOYING MAGNETIC STORAGE

Filed May 21, 1956 4 Sheets-Sheet 3

INVENTOR.
HAROLD J. McCREARY
BY [signature]
ATTY.

Feb. 3, 1959 H. J. McCREARY 2,872,525

REGISTER-SENDER SYSTEM EMPLOYING MAGNETIC STORAGE

Filed May 21, 1956 4 Sheets-Sheet 4

INVENTOR.
HAROLD J. McCREARY
BY Mc Watters Owen
ATTY.

United States Patent Office 2,872,525

Patented Feb. 3, 1959

2,872,525

REGISTER-SENDER SYSTEM EMPLOYING MAGNETIC STORAGE

Harold J. McCreary, Lombard, Ill., assignor to General Telephone Laboratories, Incorporated, a corporation of Delaware Application May 21, 1956, Serial No. 586,234

25 Claims. (Cl. 179—18)

The present invention relates in general to telephone exchange systems, and more particularly to a register sender incorporating a magnetic memory system in which digit values to be transmitted are registered as corresponding residual magnetizations in semi-permament magnets. A memory device of the general character contemplated in the present invention constitutes an essential element of the circuit arrangement described in my copending application Ser. No. 521,689, filed July 13, 1955.

The comparable register senders presently in use, one of which is known as a "Director," incorporate a storage system wherein a group of four relays, hereafter to be referred to as codel relays, is used to store each digit; and a rotary switch is used to distribute information to the relays. This invention relates to a simplification of the codel relay storage system, in that a device is provided which combines the rotary switch and storage functions to effectively eliminate a considerable number of relays, relay contacts, and sliding switch contacts. A saving of space, greater reliability, as well as simplicity and economy are thereby afforded.

A novel translation circuit is also described in this invention, wherein groups of digits, each group consisting of seven digits or less, are stored in a plug-in or patch board. Each of these groups of digits will hereafter be referred to as a routing directive. The comparable translator presently in widespread use is equipped with a separate relay for each routing directive, and a particular directive is selected and stored in response to energizing the corresponding relay in the translator. In this invention, there are no relays in the translator and the desired directive is selected and stored by the numerical positioning and grounding of a Strowger switch wiper in response to dialling the first two digits, or office code, of a called subscriber's directory telephone number. In this manner, any one of 100 different directives can be selected, and the plug-in or patch board makes it very convenient to change the routing directive to meet new conditions.

Accordingly, it is the principal object of this invention to provide a novel register sender which offers considerable economic advantage, and also offers substantial simplification over comparable known systems.

Another object of this invention is to provide a simplified system wherein the office-code portion of the called subscriber's number is translated into the proper routing directive and registered in the memory device in response to dialling the office code, the terminal portion of the called subscriber's number being thereafter sequentially registered in the memory device, without translation, as it is dialled.

Still another object of this invention is to provide a simplified translator, as compared with other known systems, wherein the group of routing directives is conveniently set up in a plug-in or patch board, and a directive is selected therefrom in response to dialling the office code portion of a called subscriber's number.

Still another object of this invention is the provision of a register sender for telephone systems wherein a new and improved means is used for translating and registering digits in response to dialling a subscriber's directory telephone number and reserving such digits until all of the digits representing the called subscriber's number are dialled whereupon said stored digits are translated into corresponding digital impulses and transmitted.

Other objects and features together with those above will appear upon a further perusal of the following description taken in conjunction with the accompanying drawings which illustrate an embodiment of the invention in the form of a schematic circuit diagram. The overall circuit, which consists of Figures 1 through 4, will be best understood by orienting the drawings so that Fig. 1 is to the left of Fig. 2, Fig. 3 is above Fig. 2, and Fig. 4 is to the right of Fig. 3, with the corresponding lines in alignment.

The top half of Fig. 1 represents the equipment associated with the calling line and the first office selector, and the bottom half shows the code selector associated with a particular register sender. This circuit is identical to Fig. 1 in my Patent 2,567,115, issued September 4, 1951, but it has been repeated here to facilitate a thorough description of this invention.

Figure 1:
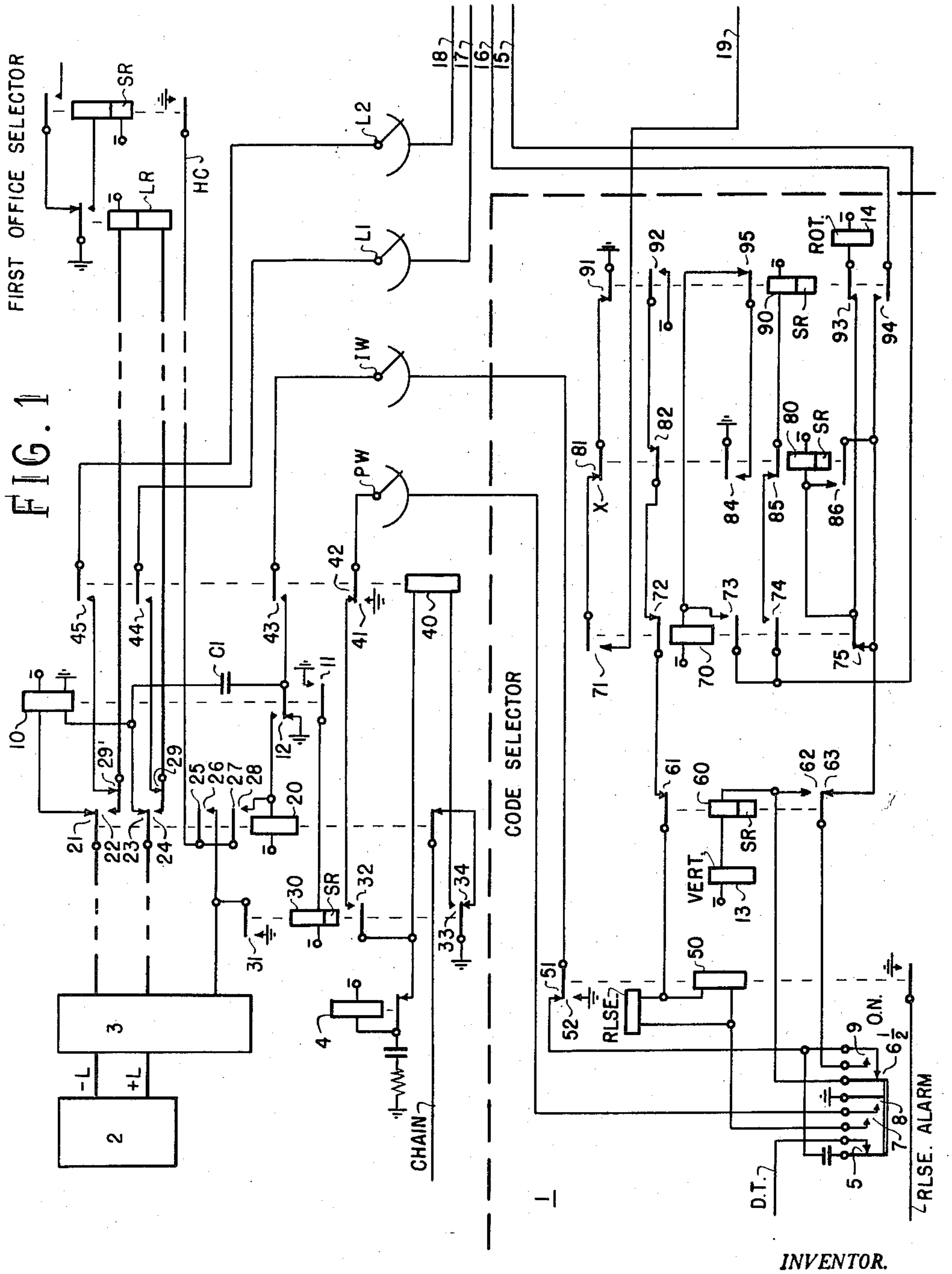
Figure 2:
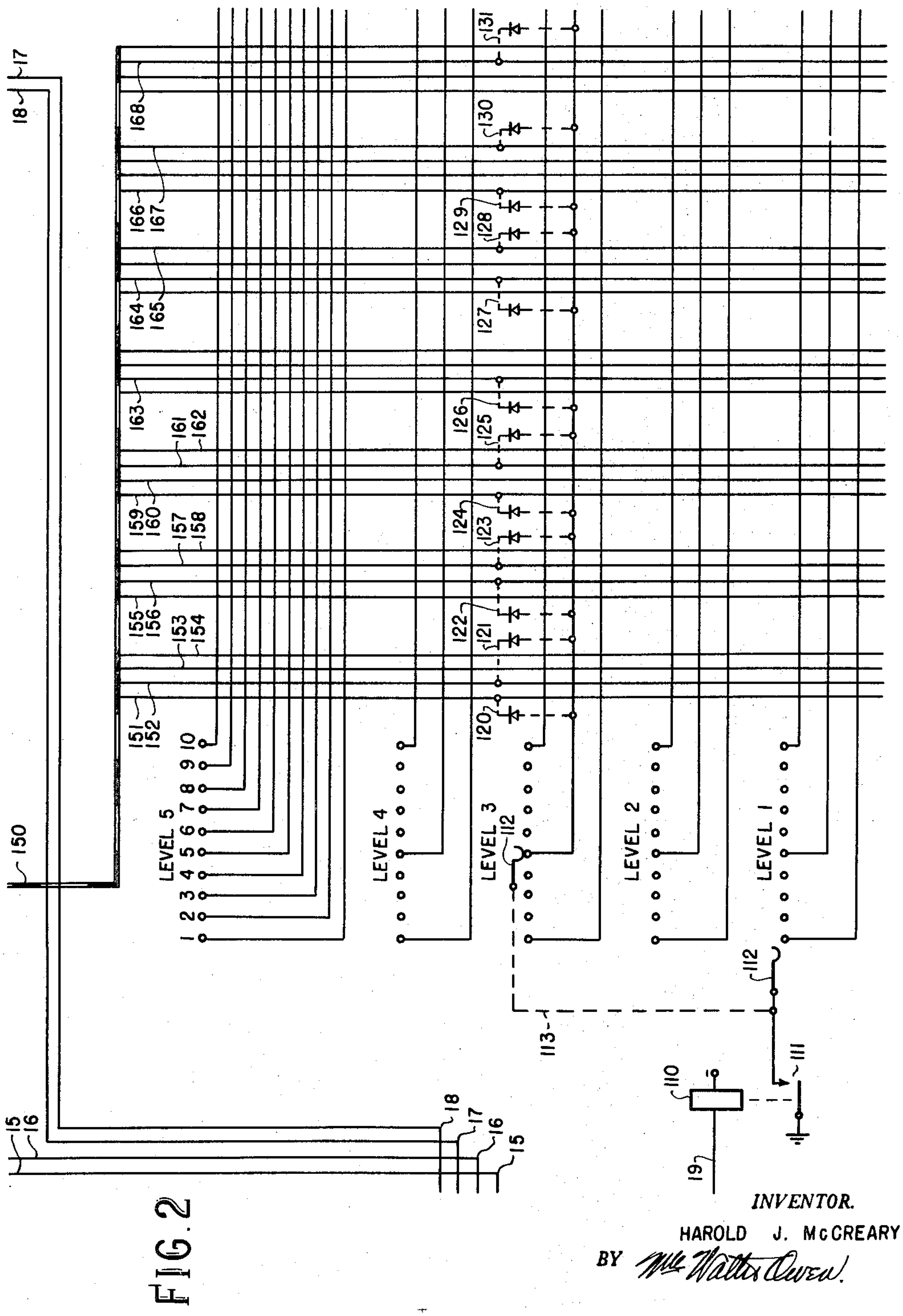
Fig. 2 represents the translator, which is shown by way of example as a patch board.

When a subscriber at substation 2 (Fig. 1) initiates a call, lineswitch 3 is seized and wipers PW, IW, L1 and L2 are rotated until an idle code-selector is found. Thereafter, the subscriber dials a six digit directory telephone number. The first two dialled digits, or office code, cause the vertical and rotary positioning of code selector switch wiper 112, and said wiper is thereafter grounded at contact 111 (Fig. 2). This ground causes translation of the dialled 2-digit office code into a directive of seven digits or less, and causes said directive to be registered in storage disks 200, 210, 220 and 230. The last four dialled digits are pulsed into relay 250 and sequentially registered in said disks, without translation, as they are dialled. After the last digit has been registered, the stored group of digits is automatically and sequentially pulsed over lines 17 and 18 to the line relay LR in the first office selector, whereafter the register-sender releases and becomes available to other calling subscribers.

*Detailed description*

The invention will now be described in detail with reference to the drawings, Figs. 1 through 4. At the outset, the subscriber at substation 2 (Fig. 1) raises his handset and the substation is immediately connected to the lineswitch 3 in a manner well-known in the art. Relay 10 then operates over a circuit including the following elements: battery, relay 10, contact 21, lineswitch 3, negative side of the line to substation 2, substation 2, the positive side of the line to substation 2, lineswitch 3, contact 23, and ground on relay 10. Contact 11 of relay 10 thereupon closes and completes an obvious operating circuit to slow-release relay 30; and contact 12 prepares a circuit for relay 20.

Slow-release relay 30 operates, and the associated contacts cause the following operations: contact 31 grounds the release trunk to hold the lineswitch; contact 32 connects the motor magnet 4 to the private wiper PW; contact 33 completes a circuit from ground through contacts 33, relay 40, the self-interrupting contacts of relay 4, and relay 4 to battery; and contact 34 breaks to remove ground from the Chain lead. In the event that wipers PW, IW, L1 and L2 are contacting a busy register sender, wiper PW will be grounded over contact 8 of the off-normal switch ON, thus placing a short circuit around relay 40 to prevent its operation, and motor magnet 4 operates. Magnet 4 is thereupon deenergized by its self-interrupting contacts, and this deenergization steps the wipers PW, IW, L1 and L2 to the next consecutive bank contact. This stepping process continues until an idle condition is found, at which time relay 40 is not shorted by a circuit over wiper PW and relay 40 operates in series with motor magnet 4. The resistance of relay 40 is such that motor magnet 4 does not operate at this time.

When relay 40 operates, contact 41 grounds the PW wiper to mark the circuit busy; contact 42 breaks to open the circuit to motor magnet 4; contact 43 provides a path for returning dial tone to the calling subscriber, including dial tone terminal DT, ON contact 5, contact 51, wiper IW, contact 43, condenser C1, contact 23, and the positive side of the line to substation 2; and contacts 44 and 45 close a pulsing circuit for the line relay LR, said circuit to be described below.

Relays 10, 30 and 40 are now operated, and the system is prepared for dialling. The subscriber dials at substation 2 and pulses are sent out over the calling subscriber's line in accordance with the digits dialled. These pulses interrupt relay 10.

The first pulse of the first dialled digit operates vertical magnet 13 over a circuit including the following elements: ground, armature 12 of relay 10, contact 43, wiper IW, contact 51, ON contact 6, slow-release relay 60, vertical magnet 13, and battery. Relay 60 and magnet 13 both operate, the latter causing wiper 112 (Fig. 2) to take the first vertical step, thereby causing off-normal switch ON to operate. ON contacts 5 and 6 break, and contacts 7, 8 and 9 make. Subsequent pulses of the first digit operate magnet 13 over a circuit including contacts 9 and 62, instead of 6, and wiper 112 is stepped to the proper level. It should be observed that operation of switch ON causes the dial tone circuit to be opened at contact 5, and that wiper PW is grounded at contact 8. Slow-release relay 60 remains operated until the first series of pulses is completed and then switches the impulsing circuit to the rotary magnet.

As the second digit is dialled at substation 2, slow-release relay 80 and rotary magnet 14 are operated in parallel over the following circuit: from ground, through contacts 12 and 43, wiper IW, contacts 51, 9, 63 and 75, and then through relay 80 to battery and through contact 93 and magnet 14 to battery. Relay 80 operates and remains operated throughout the pulsing caused by the second dialled digit; and magnet 14 rotates wiper 112 to the proper contact in the 100 point bank (five of the ten levels of said bank being shown at the left side of Fig. 2).

The contacts associated with relay 80 cause the following operations: contact 81 opens a point in the operating circuit of relay 110, preventing this relay from operating when relay 70 operates to close contact 71; contact 82 opens a point in the operating circuit of release magnet RLSE; contact 84 completes an obvious operating circuit for relay 70; contact 85 opens a point in the operating circuit of relay 90, preventing this relay from operating when relay 70 operates to close contacts 73 and 74; and contact 86 shorts contact 75, thereby providing a pulsing path for relay 80 and magnet 14 after relay 70 has operated.

Relay 70 operates following the first pulse of the second digit, thereby making contacts 71, 73 and 74, and breaking contacts 72 and 75. Relay 70 locks from ground through contact 301 (Fig. 3), over conductor 15, through contact 73 and relay 70 to battery. The circuits including contacts 71, 72 and 74 of relay 70 remain inoperative until relay 80 restores.

Relay 80 restores after the second series of pulses is completed, and the springs associated with relay 80 are arranged so that contact 81 closes first. When contact 81 makes, an obvious operating circuit for relay 110, including contacts 71, 81 and 91, is completed. Relay 110 operates, closing contact 111, thereby grounding wiper 112. Contact 91 breaks shortly after contact 81 makes, and therefore relay 110 is only momentarily energized. However, the momentary grounding of wiper 112 permits the storage circuit (Fig. 3) to register the directive found in the translator. The translating and storage features will be discussed in detail below.

The other contacts of relay 80, which restore after contact 81, cause the following operations: contact 82 prepares the release circuit for operation; contact 84 breaks the original energizing circuit for relay 70; contact 85 completes an operating circuit for relay 90 extending from ground and contact 301, over conductor 15, through contacts 74 and 85, and through relay 90 to battery; and contact 86 opens the operating circuit to relay 80 and magnet 14.

Relay 90 operates and causes the following operations: contact 91 breaks the momentarily completed circuit of relay 110 as described above; contact 92 prepares another point in the release circuit; contact 93 opens a further point in the pulsing circuit of magnet 14; contact 94 connects pulsing contact 12 to relay 250 so that the third dialled digit will be pulsed into relay 250; and contact 95 opens another point in the original energizing circuit of relay 70.

As mentioned above, the momentary grounding of wiper 112 after the second digit has been dialled causes a group of digits to be registered in the storage unit. The translator circuit is arranged so that the first two digits are translated into any number of digits less than 8, and this group of digits is registered when wiper 112 is grounded. An explanation of the translator and storage-device will now be given.

Figure 3:
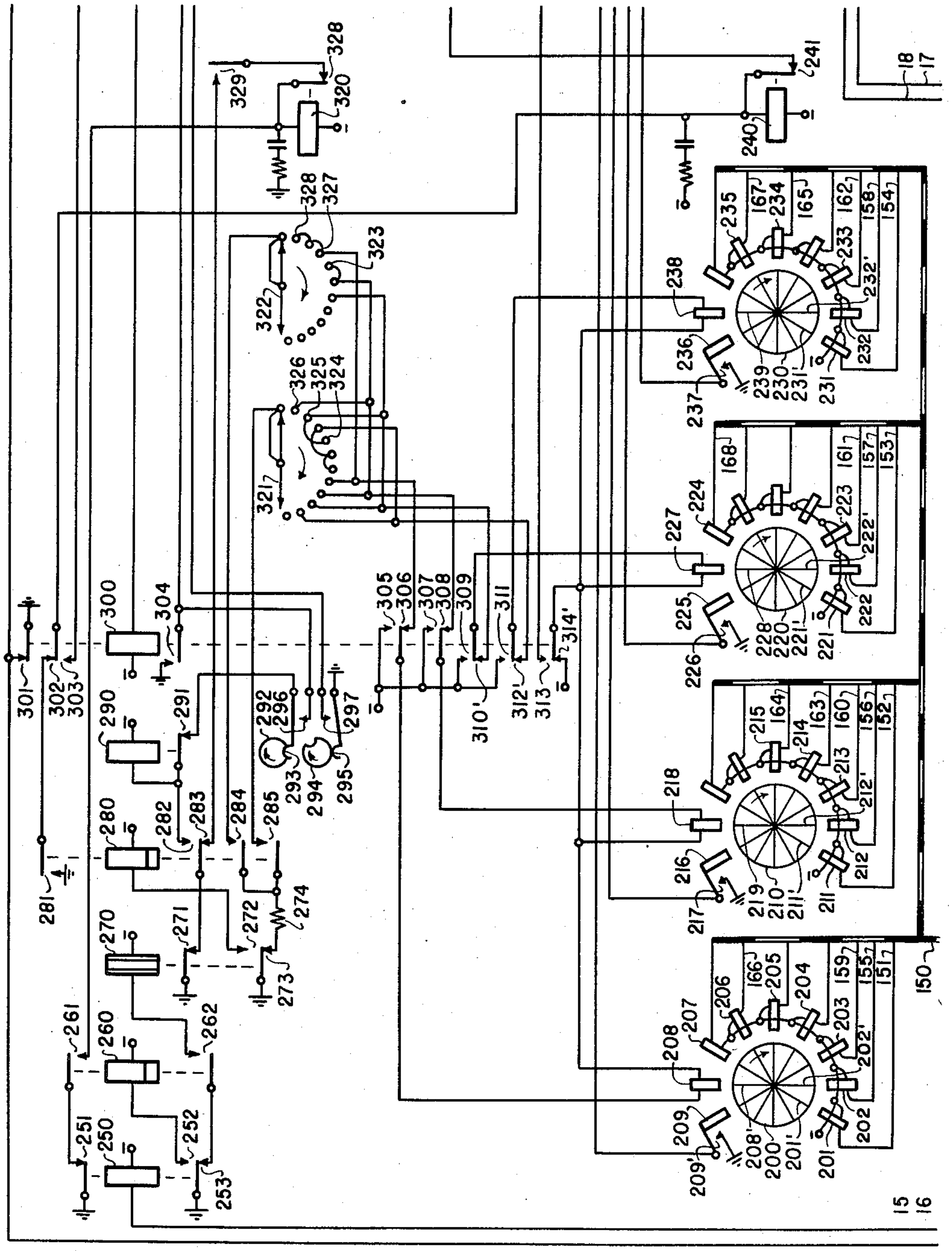
Fig. 3 represents the storage device, shown symbolically along the bottom of Fig. 3; and the circuit for sequentially storing the last four dialled digits.
Figure 4:
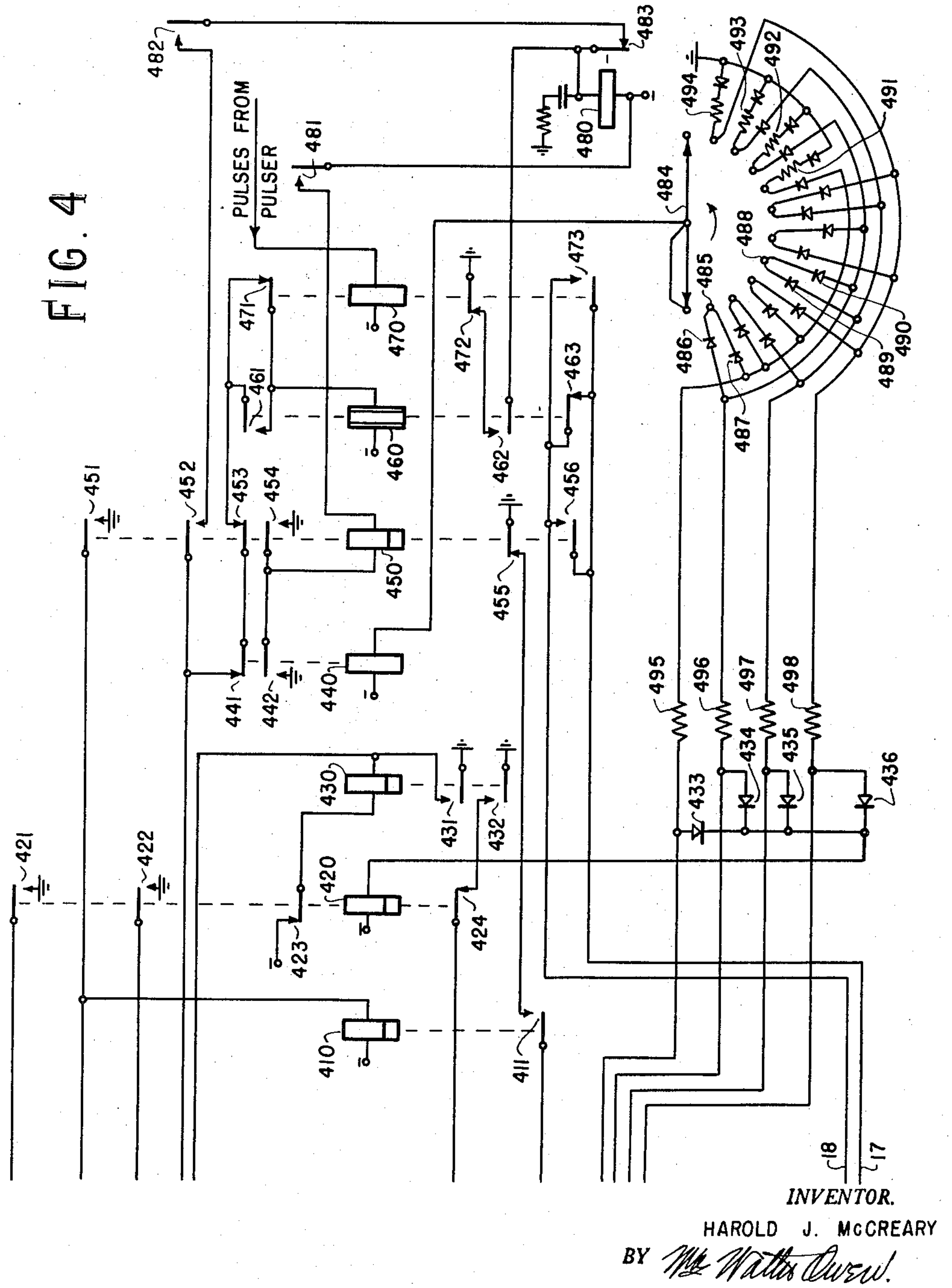
Fig. 4 represents the mechanism for transmitting the stored digits to the first office selector.

The storage unit consists of items 200 through 241 on Fig. 3 and will only be briefly described here. A more detailed explanation will be found in my copending application 521,689, as mentioned above.

The storage unit includes the four disks 200, 210, 220, and 230, each being journalled to the same shaft. Each disk is made up of twelve semi-permanent magnets arranged radially as shown, and these magnets will be referred to as "spokes." Each of these spokes, such as spoke 208′, is normally magnetized so as to have its outer end polarized North. Since each disk has twelve spokes, and the four disks are secured to the same shaft, there are twelve "rows of spokes," such as the row consisting of spokes 208′, 219, 228 and 239. Digit values are registered in these rows according to the well-known WXYZ code, as will be described below.

A group of eight magnetizing coils are associated with each disk, such as 201, 202, 203, 204, 205, 206, 207, and 208 of disk 200, these being located opposite eight successive "spokes" on the disk. The motor magnet 240 is arranged to rotate the disks one-twelfth of a revolution, in a clockwise direction, each time magnet 240 is deenergized. Thus, a "spoke" such as semi-permanent magnet 208′ will rotate from magnetizing coil 208 to coil 207, and then to 206, etc. each time magnet 240 is deenergized, and the corresponding magnets in each of the other three disks will be rotated simultaneously into the same relative positions.

Seven of the magnetizing coils associated with each disk, such as coils 201, 202, 203, 204, 205, 206, and 207 of disk 200, are also associated with the translator. One end of each magnetizing coil in this group is connected to battery, and the other end of each coil is connected to a lead that extend to the translator over cable 150. Leads 151 to 168 are marked in Figures 2 and 3 so as to indicate their relative positions. Thus, 24 leads extend to the translator from the magnetizing coils. It will be observed that these leads are arranged in six groups of four leads each, that each of the magnetizing coils represented by the leads in a particular group is associated with a different one of the four storage disks, and that each of the four magnetizing coils represented by a group of four leads is located in the same relative position with respect to its storage disk (e. g. leads 151, 152, 153, 154 and coils 201, 211, 221, and 231, respectively). When any of these 24 leads is grounded in the translator, the magnetizing coil associated therewith will be energized.

Each of the 100 contacts in the 100 point switch bank of the code selector, 50 of which are shown at the left of Fig. 2, is provided with a lead that extends into the translator. Contacts 1, 5 and 10 in levels 1 through 4, and contacts 1 through 10 in level 5 of the switch bank are equipped with leads in Fig. 2, but it should be under stood that there would normally to 100 such leads, one connected to each contact of the 100 point bank. These leads are arranged so as to be connectable with any of the 24 leads from the magnetizing coils. The connections between the various leads may be made by using patch-cords, or by means of a plug-board, a rectifier being located in each connecting link to prevent interaction between the various groups of leads.

The above-mentioned group of 24 leads are separated into groups of four so that each group will correspond to a digit in the well-known WXYZ code, wherein:

| | |
|---|---|
| WX represents 1 | YZ represents 6 |
| WY represents 2 | W represents 7 |
| WZ represents 3 | X represents 8 |
| XY represents 4 | Y represents 9 |
| XZ represents 5 | Z represents 10 |

The left hand lead in a particular group corresponds to the letter W in said code, the next adjacent lead to X, the next adjacent lead to Y, and the right hand lead to Z; and digits are registered in the storage unit (in a manner to be described below) when the corresponding leads, such as 151 and 153 or 155 and 157 for the digit 2, are grounded over the patch cords and wiper 112.

Let us now assume, for example, that the subscriber at substation 2 is dialling directory telephone number 35–4179. As the first two digits are dialed, wiper 112 is raised to the third level and then rotated to the fifth terminal in the third level, in the manner previously described. This position is indicated by dotted line 113 in Fig. 2. The wiper is then momentarily grounded, as previously described, which grounds various leads extending from the magnetizing coils through rectifier leads 120 to 131 in the translator, and through contact 5 in level 3 of the switch bank. Thus, coils 201, 203, 206, 211, 212, 214, 215, 222, 223, 224, 234, and 235 are energized over leads 151, 159, 166, 152, 156, 163, 164, 157, 161, 168, 165 and 167 respectively. Grounded leads 151 and 152 correspond to letters WX in the WXYZ code thereby representing the digit 1; grounded leads 156 and 157 correspond to XY and digit 4; grounded leads 159 and 161 correspond to WY and digit 2; grounded lead 163 corresponds to X and digit 8; grounded leads 164 and 165 correspond to XZ and digit 5; grounded leads 166 and 167 correspond to WZ and digit 3; and grounded lead 168 corresponds to Y and digit 9. Therefore, reading from left to right in the translator, the seven digit group 1428539 is represented by the array of patch cords 120 to 131 connected to contact 5 in level 3 of the Strowger switch bank.

When these magnetizing coils are energized by means of the momentary ground on wiper 112, the semi-permanent magnets or spokes directly opposite the energized coils are reversed in polarity. Certain of the magnets, all of which are normally magnetized with their north poles out, are thereby reversed in magnetism so as to have their south poles out. Thus, an array of south polarized spokes is set up in the storage disks corresponding to the patch cord array in the translator. The digits 1428539 are therefore registered in successive rows of semi-permanent magnets, where the first row consists of magnets 201, 211, 221 and 231, the second row consists of magnets 202, 212, 222 and 232, etc. The magnets in each row will all appear successively beneath the corresponding polarity sensing magnets 209, 216, 225 and 236 at the same time to facilitate the sending operation.

In the manner above described, any one of 100 directives, each consisting of seven digits or less, can be selected by the first two digits dialled by a subscriber and registered in the storage unit before the third digit is dialled. A given directive can be readily changed by merely changing the pattern of connecting points or jumpers within the translator.

The first two digits have now been dialled, the corresponding seven digit directive registered in the storage device, and the subscriber now dials the last four digits of the called subscriber's number. These four digits are sequentially registered in the storage unit as they are dialled, and the circuit operation causing this function will now be discussed in detail.

The third and subsequent digits are pulsed into relay 250 over the following path: from ground through contacts 12 and 43; wiper IW; contacts 51, 9, 63 and 94; and over lead 16 through relay 250 to battery. When relay 250 is first energized over this circuit during the first pulse, slow-release relay 260 is energized over an obvious circuit and remains operated during pulsing. When relay 250 restores at the end of the first pulse, a circuit is completed from ground through contacts 253 and 262, and through slow-release relay 270 to battery, and a circuit is also completed from ground through contacts 251 and 261, and through motor magnet 320 to battery. Relay 270 remains operated during the pulsing, whereas magnet 320 steps wipers 321 and 322 clockwise to each successive contact as the pulses are repeated by relay 250. When wipers 321 and 322 take the first step, off-normal contact 329 closes. When relay 270 operates, slave relay 280 operates from ground at contact 272, and contact 273 opens. Thus, relays 260, 270, and 280, remain operated during pulsing, while relay 250 and magnet 320 operate and then deenergize each time a pulse is received.

After the last pulse of the third dialled digit has been received, relay 260 restores, followed by restoration of relay 270, and then relay 280 restores. During the interval following restoration of relay 270, but before slow-release relay 280 restores, contacts 271 and 273 of relay 270 are closed. Thus, wiper 321 is grounded over contacts 285 and 273; and wiper 322 is grounded over contacts 284 and 273. Motor magnet 290, which steps cams 292 and 294 in a clockwise direction each time it is deenergized, is energized at this time over a circuit extending from ground through contacts 271 and 282 to magnet 290. The function of magnet 290 will be described below.

When the wipers 321 and 322 are grounded, one or two of the magnetizing coils 208, 218, 227 and 238 are energized. The circuits involved can be best described by referring again to the assumed called subscriber number 35–4179. When 4 is dialled, wipers 321 and 322 advance to their respective fourth contacts. When the wipers are grounded, coil 218 is energized from ground on wiper 322 through bank contacts 323, then through contact 308, coil 218, and contact 314 to battery; and coil 227 is energized from ground on wiper 321 through bank contacts 324 and 325, and then through contact 310, coil 227, and contact 314 to battery. Thus, semi-permanent magnets 219 and 228 are reversed in polarity, and these polarity reversals correspond to code XY, or digit 4, in the WXYZ code.

After its slow-release interval, relay 280 restores and completes a self-interrupting circuit for the operation of magnet 320, from ground through contacts 271, 283, 329, and 328. Wipers 321 and 322 step to the home position, as magnet 320 is energized and deenergized over this self-interrupting circuit. At the home position, off-normal contact 329 opens to stop the stepping action, Restoration of 280 also causes motor magnets 240 and 290 to be deenergized, due to the opening of contacts 281 and 282, respectively. Motor magnet 240 was energized when relay 280 was originally energized, over a circuit including contacts 281 and 302. The storage disks are caused to rotate one clockwise step each time motor magnet 240 is deenergized, and are therefore rotated when contact 281 breaks. Motor magnet 290 steps cams 292 and 294 one step when contact 282 breaks, closing off-normal contact 296. The function of these cams and their associated contacts will be described in detail below.

The fourth digit of the called subscriber's number, which was assumed to be the number 1, is now dialled by the calling subscriber at substation 2. Relays 250, 260, 270, and 280, and motor magnet 320, are all operated by the single pulse of the fourth digit in the manner above described. Wipers 321 and 322 are thereby rotated to the first bank contact, and are grounded after slow-release relays 260 and 270 restore. Magnetizing coil 208 is energized from ground at wiper 322 through bank contacts 327 and 328, and then through contact 306, coil 208, and contact 314 to battery; and coil 218 is energized over a similar circuit, including wiper 321, bank contact 326, contact 308, and contact 314; and magnet 290 is again energized. Relay 280 then restores, wipers 321 and 322 step to their home position, motor magnet 240 steps the storage disks, and motor magnet 290 steps cams 292 and 294. Thus, the fourth digit of the called number is registered by magnets 208 and 218 reversing the energization of the next set of spokes which have now been rotated into alignment therewith. The last two dialled digits are then registered in a similar manner. When magnet 290 is deenergized following the last dialled digit, cams 292 and 294 are rotated the fourth step, and contact 297 is closed. The function of this contact will be described below. With regard to the example that has been described, the eleven digit number 14285394179 has now been registered in response to dialling 35–4179.

After the last dialled digit has been registered, relay 280 and motor magnet 240 restore, causing the storage disks to take one rotary step. The row of semi-permanent magnets representing the first digit of the eleven digit group, which is the digit 1 in my example, is thereby brought into alignment with polarity sensing magnets 209, 216, 225, and 236. Each of these polarity sensing magnets is oriented with its north pole adjacent to the storage disk with which it is associated, and is located one step behind its corresponding magnetizing coil 208, 218, 227, or 238. Each polarity sensing magnet is mechanically coupled to a set of make contacts, such as contacts 209', and these are arranged to make when the magnet associated therewith is attracted to a "spoke" of the corresponding storage disk. Thus, these contacts will only make when the "spoke" aligned with a particular read-out magnet has been reversed in polarity so as to have its south pole at the periphery of the disk. This arrangement will be more readily understood upon referring to the key sender application previously mentioned (Serial No. 521,689).

When the storage disks are rotated one step following registration of the last dialled digit, the row of spokes including spokes 201', 211', 221', and 231' will move into alignment with the polarity sensing magnets. Since the first registered digit of my example is 1, and the corresponding WXYZ code is WX, magnets 209 and 216 are attracted to spokes 201' and 211' respectively, thereby closing contacts 209' and 217, respectively. A circuit is completed from ground through contact 209' and rectifier 433 (Fig. 4), to slow-release relay 420 and battery; and a second circuit is completed from ground through contact 217 and rectifier 434, to relay 420 and battery. Similar operating circuits for relay 420 can also be traced from contacts 226 and 237, including rectifiers 435 and 436, respectively. Thus, relay 420 is energized when any one or more of the contacts associated with the polarity sensing magnets are closed.

Relay 420 operates, and the associated contacts cause the following operations: contact 421 grounds lead 15 so as to maintain relay 70 operated when contact 301 breaks; contact 422 completes an obvious operating circuit for relay 300; contact 423 opens a point in the circuit of relay 430 to prevent its operation; and contact 424 opens a further point in the self-interrupting circuit of magnet 240.

Relay 300 operates, and the associated contacts cause the following operations: contact 301 removes one of the grounds from lead 15, relay 70 being now held operated by ground at contact 421; contact 303 prepares an operating path for motor magnet 240 from ground at contact 451, contact 451 being open at this time; contact 304 completes two circuits, one through contacts 304, 441, 453, and 471 for operating relay 460 when contacts 471 are closed, and the other including contacts 304, 296, 291, and magnet 290 to step cams 292 and 294 to the home position, at which point contact arm 293 again engages the aperture in cam 292 and contact 296 opens the self-interrupting circuit; and contacts 305, 307, 309, 311, and 313 prepare erasing circuits for magnetizing coils 208, 218, 227, and 238.

Relay 470 is operated intermittently over a circuit extending from the pulser (not shown), which energizes relay 470 at the rate of ten pulses per second. Thus, the above described operating circuit for slow-release relay 460 will only be effective when relay 470 is deenergized with contact 471 closed. Relay 460 locks over contact 461 and remains operated throughout the series of pulses, these being controlled by contact 473.

When relay 460 operates in response to the restoration of relay 470, contacts 456, 463 and 473 are all open and the first pulse is thereby placed on lines 17 and 18. The pulsing circuit extends from ground through the bottom half of relay LR (Fig. 1), through contacts 29 and 44 to wiper L1, over lead 17 to contact 473, back over lead 18 to wiper L2, and through contacts 45 and 29' to the top half of relay LR and battery. Wiper 484 is stepped in a counterclockwise direction to its first bank contact due to the circuit through motor magnet 480, extending from ground through contacts 472 and 462 to magnet 480 and battery. Off-normal contacts 481 and 482 are closed when the wiper takes this first step. Upon reenergization of relay 470, magnet 480 is released due to the break of contact 472, and lines 17 and 18 are shorted at contact 473 to complete the pulse to relay LR. Forgetting the example number for a moment, and assuming that the digit being transmitted is larger than 1, relay 470 will then restore again, causing contact 473 to open and place the second pulse on lines 17 and 18, and magnet 480 will again be energized over contact 472 and step the wiper to the second bank contact. In this manner, a series of pulses is placed on lines 17 and 18, and wiper 484 takes one step as each pulse is transmitted.

When wiper 484 reaches the bank contact corresponding to the digit being transmitted, such as the sixth rotary contact when a 6 is being transmitted or the fourth rotary contact when a 4 is being transmitted, relay 440 operates over a circuit through wiper 484. Relay 450 then operates, and lines 17 and 18 are shorted at contact 456 to prevent the transmission of further pulses. This "counting" feature will now be described in detail, with reference to the registered number 14285394179 that was chosen as an example.

As described above with reference to this example number, the disks are rotated after the last dialled digit is registered and spokes 201', 211', 221', and 231' are thereby moved into alignment with polarity sensing magnets 209, 216, 225, and 236, respectively. Magnets 209 and 216 are attracted to spokes 201' and 211' due to the polarity reversal in these spokes, and contacts 209' and 217 make. Various bank contacts associated with wiper 484 are thereby grounded through resistor 495 and 496, respectively.

Marginal relay 440 is margined to prevent its operation in series with any one of resistors 491 to 498, but it will operate in series with a parallel combination of any two of these resistors. Thus, when one pulse is transmitted over lines 17 and 18, and wiper 484 steps to contact 485, relay 440 operates. Contact 485 is connected to ground at contact 209' through resistor 495 and rectifier 487, with a parallel path from ground at contact 217 through resistor 496 and rectifier 486. When relay 440 operates, relay 460 is restored due to the break at contact 441, and a circuit is completed from ground through contact 442, slow-release relay 450, and contact 508 to battery. Relay 450 then operates, and contact 456 shorts out lines 17 and 18 to terminate the pulsing.

Relay 450 operates, and the contacts associated therewith cause the following operations: contact 451 completes an obvious circuit for operating relay 410, and a parallel circuit from ground through contacts 451 and 303 for energizing magnet 240; contact 452 completes a self-interrupting circuit for magnet 480, from ground through contacts 304, 452, 482, and 483 to magnet 480 and battery, and wiper 484 steps to the home position at which point off-normal contact 482 breaks the circuit; contact 453 opens a further point in the locking circuit of relay 460; contact 454 completes an obvious locking circuit for relay 450 to prevent its restoration when wiper 484 is stepped to the next contact; contact 455 opens a point in the erasing circuit; and contact 456 shorts lines 17 and 18 to terminate the pulsing of relay LR in the first office selector.

When wiper 484 takes the first step toward the home position, the ground circuit through resistor 496 is opened and marginal relay 440 restores. Relay 440 will not remain operated in series with resistor 495, which is now connected to wiper 484 through the second bank contact. Wiper 484 continues its stepping to the home position, where contact 481 opens the holding circuit of relay 450, and contact 482 opens the self-interrupting circuit of magnet 480. Relay 450 releases after a short delay and this delay together with the normalizing time of magnet 480 and the fractional pulse time that occurs if relay 470 is energized when relay 450 restores, determines the inter digital time period.

When relay 450 restores, contact 451 opens the circuits of relay 410 and magnet 240, contact 452 opens another point in the normalizing circuit of magnet 480, contact 453 closes a point in the operating circuit of relay 460, contact 454 opens another point in the locking circuit of relay 450, contact 455 completes the erasing circuit, and contact 456 opens one of the shorts on the pulse-out leads.

When magnet 240 is deenergized, the storage disks are rotated one step, whereupon the transmitted digit 1 is erased from the storage disks, and transmission of the next subsequent digit is initiated. These functions will now be described.

The erasure occurs when the storage disks are rotated one step, as above described, and the row of semi-permanent magnets, consisting of 201', 211', 221', and 231', is rotated into alignment with magnetizing coils 208, 218, 227, and 238. It will be recalled that relay 410 is energized during the period that relay 450 is energized, and that relay 410 is deenergized when relay 450 restores. However, slow-release relay 410 remains operated for a short time after relay 450 restores. During that time, a circuit is completed from ground through contacts 455, 411, and 313 to each of said magnetizing coils, and from these coils through contacts 305, 307, 309, and 311 respectively, to battery. The direction of current flow is reversed as compared with the current flow when registering digits, and is such as to restore all of the adjacent semi-permanent magnets to their normal magnetism. Thus, spokes 201' and 211' are reversed to normal when they are rotated into alignment with coils 208 and 218, and the periphery of all spokes in the row is again polarized north. Relay 410 then restores and opens the erasing circuit at contact 411. It should be understood that although this erasing means constitutes the preferred embodiment, alternate erasing means may be provided. One such alternate would consist of placing permanent magnets between each polarity sensing magnet and the adjacent magnetizing coils. As a row of spokes would rotate past these magnets, the outer end of each spoke would be restored to its normal north magnetism.

As mentioned above, transmission of the next subsequent digit, which is the digit 4 in my example, is initiated by rotation of the storage disks following transmission of the preceding digit. When the disks are rotated following transmission of the digit 1 in my example, the row of spokes including spoke 201' is rotated out of alignment with the polarity sensing magnets, and the row of spokes including spoke 202' is rotated into alignment with said magnets. Slow-release relay 420 remains operated during this interval, thereby holding ground on lead 15 (contact 421) and holding relay 300 operated (contact 422). Polarity sensing magnets 209 and 216 are restored to normal when spokes 201' and 211' are rotated out of alignment therewith, causing contacts 209' and 217 to open; and then spokes 212' and 213' (representing code XY, or digit 4) come into alignment with magnets 216 and 225, respectively, whereupon said magnets are attracted to the south polarity in said spokes to thereby close contacts 217 and 226.

Relay 460 operates from ground at contact 304 after relay 470 is restored by the pulser. Contact 463 is opened to place the first pulse on lines 17 and 18, and motor magnet 480 steps wiper 484 to contact 485. Marginal relay 440 does not operate in series with resistor 496, over a circuit including contact 217 and rectifier 486. Relay 470 is again operated by the pulser, closing contact 473 to terminate the first pulse on lines 17 and 18, and opening contact 472 to deenergize magnet 480. Relay 470 is then restored by the pulser, thereby opening contact 473 to place the second pulse on lines 17 and 18, and wiper 484 takes the second step. Slow-release relay 460 remains energized during this stepping operation, which continues until wiper 484 finds a parallel path through two of resistors 491 to 498. This occurs when relay 470 restores to place the fourth pulse on lines 17 and 18, and the wiper steps to contact 488. Relay 440 then operates over parallel circuits including rectifiers 489 and 490, resistors 496 and 497, and contacts 217 and 226. Relay 450 then operates to terminate the pulsing. Wiper 484 normalizes, relays 440, 450, and 460 restore, the storage disks are rotated one step, the second digit is erased, and relay 410 restores, all in the manner above described.

Thus, each registered digit is pulsed onto lines 17 and 18 and into relay LR in the proper sequence, the digits being separated by an appropriate inter-digital time period, and each stored digit is erased after it is sent. Although a counting system including wiper 484 and resistors 491 to 498 is shown as the preferred embodiment of my invention, it should be understood that alternate counting schemes may be provided. One such alternate is shown in my previously mentioned copending application Ser. No. 521,689, wherein a pair of wipers (171 and 172) and a pair of relays (R200 and R300) accomplish the same result.

*Pulsing with a translator code of less than seven digits*

When the directive from the translator consists of less than seven digits, the storage disks will have some blank spaces. In this case, the digits of the directive are stored immediately preceding the last four digits of the called subscriber's number. For example, if a three digit code is marked in the translator, the first of these three digits will be registered by the row of magnetizing coils including coil 205, the second digit by the row including coil 206, and the third digit by the row including coil 207. Thus, a stored digit will not appear under the polarity sensing magnets when the disks are rotated following registration of the last dialled digit, spokes 201', 211', 221', and 231' all retaining their normal north polarity. The transmission of pulses in this situation, is initiated by motor magnet 290 and relay 430. This function will now be described in detail.

It will be recalled that as each of the last four dialled digits is registered, cams 292 and 294 are rotated one step by magnet 290. Each step is taken when magnet 290 is deenergized, and this occurs when relay 280 restores. It will also be recalled that magnet 240 is deenergized, stepping the storage disks, when relay 280 restores. Thus, the storage disks and the cams are rotated simultaneously. When cam 294 takes this fourth step, a circuit is completed from ground at contact 297 through relay 430 and contact 423 to battery. If a seven digit directive had been stored in the disks, a circuit would also be completed from battery and relay 420 through rectifier 433, 434, 435 or 436, and contact 209', 217, 226 or 237, respectively, to ground. Thus, relays 420 and 430 are energized at approximately the same time when a seven digit directive has been stored. However, relay 420 is arranged to operate faster than relay 430, whereupon contact 423 opens the operating circuit of relay 430.

If a directive of less than seven digits has been stored, relay 420 will not operate to prevent the operation of relay 430. Relay 430 operates and locks at contact 431. Contact 432 completes a circuit from ground through contacts 432, 424, and 241 to magnet 240 and battery. Motor magnet 240 operates over this self-interrupting circuit, and steps the storage disks until the row of spokes storing the first digit of the directive is rotated into alignment with the polarity sensing read-out magnets. Relay 420 then operates, opening the circuits to magnet 240 and relay 430. Relay 300 then operates, cams 292 and 294 are normalized, and the pulsing operation is initiated, all in the manner described above.

*Release*

After the last digit is sent, the stored disks are rotated one step, and a row of semi-permanent magnets all having their north poles out will line up with the read-out elements. Contacts 210, 217, 226, and 237 all remain open, and relay 420 then restores. Relay 300 is thereby deenergized due to the opening of contact 422, and the operating circuit of relay 460 is then opened at contact 304 so that no further pulses can be placed on lines 17 and 18.

Since relay 300 is not deenergized until after relay 420 restores, there is a short interval wherein contacts 421 and 301 are both open. Ground is thereby removed from lock-up relay 70 (Fig. 1), and this relay restores. Contact 72 completes a circuit through the release magnet RLSE, from ground through contacts 8 and 7, through the release magnet and relay 50 in parallel, and through contacts 61, 72, 82, and 92 to battery. Wiper 112 restores to its normal position, thereby restoring switch ON. The operation of relay 70 also opens the circuit to relay 90, due to the opening of contacts 74, but relay 90 is a slow-release type and holds until after wiper 112 has restored.

Relay 50 operates in parallel with the release magnet over the circuit described above, and contact 52 is closed. A circuit is thereby completed from ground at contact 52 through wiper IW, and through contacts 43 and 12 to relay 20 and battery.

Relay 20 operates, causing the following operations: contacts 21 and 23 break the circuit to relay 10; contacts 22 and 24 extend the calling subscriber's line to the train of operated switches; contact 25 grounds the release trunk to hold the line switch, the ground extending back over the holding conductor HC from the automatic switch train; and contact 26 locks relay 20 to the grounded lead HC.

Relay 10 restores, whereupon relay 30 is restored due to the opening of contact 11, and relay 40 is then restored due to the opening of contact 33. When relay 40 restores, ground at contact 41 is disconnected from wiper PW to remove the busy indication. The register sender is thereby released and prepared for use on other calls.

After conversation, and responsive to the called subscriber's hanging up, ground is removed from holding conductor HC to release the calling line switch and relay 20.

What has been described is considered to be the preferred embodiment of my invention and it is to be understood that modifications may be made in the structure and organization of my invention, in addition in those described, without departing from the spirit thereof as defined in the appended claims.

What is claimed is:

1. In a telephone system, a plurality of substations, each of said substations represented by a multi-digit directory telephone number, a storage unit comprising a plurality of semi-permanent magnets, means responsive to dialling one of said numbers at one of said substations for registering a plurality of digits in said storage unit as corresponding residual magnetizations, a first group of said plurality of digits being registered simultaneously in response to dialling a first group of digits of said one number and a second group of said plurality of digits being registered sequentially in response to dialling a second group of digits of said one number, and means for transmitting a plurality of series of impulses corresponding to the digit values of said magnetizations.

2. In a telephone system, a plurality of substations, each of said substations represented by an individual directory telephone number, a telephone dial at each of said substations, a plurality of register-senders, a first office selector, means associated with the selector responsive to the initiation of a call at one of said substations for selecting an idle one of said register-senders, connections in said one register-sender representing a plurality of routing directives, each of said directives consisting of seven digits or less, means responsive to dialling the first two digits of one of said numbers at said one substation for operating said selected register-sender to select one of said directives, a storage device in said selected register-sender, said device consisting of a plurality of semi-permanent magnets wherein digits are registered as corresponding residual magnetizations, means in said register-sender for registering said selected directive in said storage device, means in said register-sender responsive to dialling the last four digits of said one number for sequentially registering the said four digits in said storage device as they are dialled, a line relay in said selector, means in said register-sender effective after the last digit has been dialled for sequentially translating said stored digits into corresponding digital impulses, said impulses causing the operation of said relay, means effective after all of said stored digits have been pulsed into said relay for connecting the calling line to said selector, whereupon said register-sender is released and made available for calls originating at other of said substations.

3. In a telephone system in which directory telephone numbers are composed of office-designating and line-designating digits, a plurality of subscribers' substations each including a dial, one of said numbers associated with each of said substations, a code selector switch, means for seizing said switch upon the initiation of a call at a calling one of said substations, means in said switch responsive to dialling the office-designating digits of a called subscriber's directory telephone number for operating said switch to a corresponding predetermined position, a storage device associated with said switch in which digits are registered as corresponding residual magnetizations in a plurality of semi-permanent magnets, translating means connected to said switch and operated to register a variable number of coded office digits in said storage device dependent upon the operated position of said switch, means for registering said line designating digits in said storage device without translation as they are dialled at said calling subscriber's substation, an impulse sender, a first office selector, said sender operative after registration of the last dialled digit to transmit a plurality of series of impulses to said selector corresponding to the registered digits.

4. A telephone system as claimed in claim 3, in which said impulse sender includes a plurality of read-out elements, together with means in said impulse sender for moving successive groups of said magnets into alignment with said elements, one of said registered digits being registered in each of said successive groups, combinations of said elements being operated in response to the tractive influence of said corresponding residual magnetizations in said groups, and each of said operated combinations of armatures corresponding to one of said plurality of series of impulses.

5. In a telephone system in which directory telephone numbers are composed of office-designating digits and line-designating digits, a translation field composed of a first group of leads and a second group of leads, each of said leads in said first group individually connectable to each of said leads in and second group, means for selecting and grounding an individual one of said leads in said first group, said last means effective in response to the receipt of certain of the digits of a called directory telephone number, a storage device in which digits are registered as corresponding residual magnetizations in semi-permanent magnets, a plurality of connecting links including rectifiers, means including said links for individually associating each lead in said first group with a plurality of said leads in the second group in accordance with a group of digits, said storage device effective to register the group of digits associated with said selected lead in said first group upon the grounding of said selected lead.

6. In a telephone system as claimed in claim 5, means for sequentially registering said line-designating digits in said storage device as they are received.

7. In a telephone system as claimed in claim 6, a counting device including polarity sensitive elements associated with said storage device, means for operating said counting device after the last line designating digit has been registered in said storage device, an impulse sender, said impulse sender effective to transmit a plurality of series of impulses corresponding to stored digits as determined by the operation of the counting device.

8. In a telephone system as claimed in claim 7, means for erasing each said stored digit from said storage device after said digit has been counted and transmitted.

9. In a telephone system, a plurality of substations each having a directory telephone number and an impulse transmitter associated therewith, a plurality of register-senders, a first office selector, means in said selector responsive to the initiation of a call at one of said substations for selecting an idle one of said register-senders, a translation field in said selected register-sender having a switch wiper associated therewith, connections in said translation field representing a plurality of routing directives, each of said directives consisting of a variable number of digits, means in said register-sender for positioning said wiper and thereby selecting one of said directives in response to receipt of digital impulses corresponding to a first group of digits of a called subscriber's directory telephone number, a digital memory device comprising a rotatable storage means in said directory, said storage means comprising successive rows of radial elements normally magnetized at one polarity, said rows of radial elements capable of having digits registered therein as corresponding combinations of polarity reversals in accordance with a predetermined code, a plurality of write-in heads associated with said storage means, said heads energizable to induce said polarity reversals in said elements, means in said register-sender including said wiper and said connections associated with said selected directive effective after receipt of said digital impulses to selectively energize a first group of said heads and simultaneously register the digits associated with said selected directive in successive ones of said rows of elements, a second group of said heads, means in said register-sender for rotating said storage means, and means in said register-sender for selectively energizing said second group of heads in response to receipt of the digital impulses corresponding to each of the digits in a second group of digits of said called subscriber's directory telephone number, as said storage means is rotated, to thereby sequentially register said second group of digits in other of said rows of elements as said digits are dialled at said one substation.

10. In a telephone system such as claimed in claim 9, a plurality of read-out armatures associated with said storage means, said armatures mechanically operable responsive to the tractive influence of said elements having said reversed polarity, said rotating means again operative after receipt of digital impulses corresponding to the last digit dialled at said one substation to successively rotate said rows of elements into association with said armatures and thereby operate combinations of said armatures corresponding to the combinations of polarity reversals induced in said rows of elements, means in said register-sender for transmitting impulses to said selector, said last means operative to transmit a series of groups of pulses corresponding to the registered series of digits in response to operation of said armatures as each of said rows of elements having a digit registered therein is rotated into association with said armatures, means in said register-sender operative after each particular digit has been transmitted for restoring the elements in the row of elements corresponding to said particular digit to said normal magnetism to thereby erase said particular digit, and means in said register-sender operative after all of said registered digits have been transmitted for connecting said calling subscriber's substation to said selector, whereupon said register sender is released and becomes available for use by another calling subscriber.

11. In a telephone system, a plurality of substations having individual directory telephone numbers associated therewith, each of said numbers comprising office-designating and line-designating digits, one of said numbers associated with each of said substations, a plurality of register-senders, means responsive to the initiation of a call at one of said substations for selecting an idle register-sender, a storage element in said register-sender consisting of a plurality of magnetizable areas, means in said register-sender responsive to the receipt of pulses corresponding to said office-designating digits for inducing magnetizations of a particular polarity in various of said areas, said induced magnetizations being representative of a predetermined number of digits, means in said register-sender responsive to the receipt of pulses corresponding to said line-designating digits for inducing magnetizations in other of said areas corresponding to said line-designating digits, a plurality of armatures associated with said element, each of said armatures operated when aligned with one of said magnetized areas, means for rotating said element, said rotating means operated after receipt of the last line-designating digit to rotate successive groups of said magnetizable areas into alignment with said armatures, and means for sequentially transmitting groups of pulses corresponding to the digits represented by said magnetizations, said last means effective as areas in each of said groups of magnetizable areas are rotated into alignment with and operate the corresponding ones of said armatures.

12. In a register-sender responsive to a plurality of series of received pulses, a code selector switch, a wiper associated with said switch, means for numerically positioning said wiper in response to the first two series of pulses, a translator, a storage device including a plurality of semi-permanent magnets capable of having digits registered therein as corresponding polarity reversals in said magnets, means including said translator for controlling said magnets to register a variable number of coded digits in the storage device dependent upon the operated position of said switch wiper, means for registering other digits in said storage device independent of said translator corresponding to other of said series of pulses, and means for producing a series of pulses corresponding to each registered digit and sequentially transmitting said registered digits as a plurality of series of pulses.

13. In a register-sender such as claimed in claim 12, said producing means including a plurality of armatures, said armatures being mechanically operated due to the tractive influence of said polarity reversals in said magnets as said armatures are brought into alignment with said magnets.

14. In a telephone system, a translation field comprising a first group of leads and a second group of leads, a plurality of connecting links including rectifiers, each of said leads in said first group individually and removably connected to various of said leads in said second group by said links, means terminating said first group of leads for selecting individual ones of said leads, means terminating said second group of leads for storing digits, said last means rendered effective in response to the individual selection of said leads in said first group.

15. In a telephone system, a translation field comprising a first group of leads and a second group of leads, each of said leads a plurality of rectifiers in said first group individually and directly connectable to each of said leads in said second group means of said rectifiers, a plurality of groups of digits, one of said groups of digits individually associated with each of said leads in said first group of leads, means terminating said first group of leads for selecting an individual lead in said first group and rendering said selected lead effective, means terminating said second group of leads for storing digits, said last means operative to store the group of digits associated with said selected lead when said selected lead is rendered effective.

16. In a telephone system such as claimed in claim 15, said last means including a magnetic storage element in which said stored digits are registered as corresponding combinations of residual magnetizations in rows of semi-permanent magnets, a plurality of polarity sensitive armatures, said armatures operated in response to the tractive influence of said residual magnetizations, means for rotating said storage element, means for transmitting impulses, said rotating means operative after said group of digits has been stored to sequentially present said rows of magnets opposite said armatures, whereupon said transmitting means is operated to transmit a plurality of series of impulses corresponding to the group of stored digits as indicated by the corresponding combinations of operated armatures.

17. In an impulsing arrangement, a storage element, a plurality of heads associated with said element, said element rotatable to present successive rows of magnetizable areas opposite said plurality of heads, said heads energizable to induce magnetizations of a particular polarity in said areas, a plurality of directory telephone numbers consisting of office-designating and line-designating digits, means for selectively energizing certain of said heads to simultaneously register a variable number of coded digits in a group of said rows wherein one digit is registered as a combination of said magnetizations in each of said rows in said group in accordance with a predetermined code, said last means effective in response to receipt of pulses corresponding to the office-designating digits of a called subscriber's directory telephone number, means for rotating said element, means for selectively energizing other of said heads to induce combinations of said magnetizations in other of said rows of areas as said element is rotated, each of said last mentioned combinations being registered in successive ones of said other rows of areas in response to receipt of pulses corresponding to the individual ones of the line designating digits of said called subscriber's directory telephone number, a plurality of armatures associated with said element, said armatures operated in combination responsive to said combinations of magnetizations in said rows of areas as said element is rotated, impulse generating means, means for initiating the operation of said generating means whereby the production of impulses is initiated, said initiating means successively operated in response to the successive operation of any of said armatures as said element is rotated, means for arresting the operation of said generating means, and means for successively operating said arresting means, said operating means successively operated responsive to the particular combinations of said armatures successively operated responsive to the said combinations of magnetizations in said rows of areas as said element is rotated, to cause said generating means to sequentially produce a series of groups of impulses corresponding to said registered digits.

18. A digital memory device comprising a plurality of co-rotatable wheels, each of said wheels comprising a plurality of semi-permanent magnets arranged as radial spokes, said spokes in each of said wheels arranged in rows with said spokes in others of said wheels, each of said rows capable of having a digit registered therein as a combination of polarity reversals in accordance with a predetermined code, a plurality of write-in heads associated with said wheels, said write-in heads energizable to reverse the magnetic polarity of said spokes, means for selectively energizing a first group of said heads so as to simultaneously register a group of digits in a first group of said rows as corresponding combinations of polarity reversals, means for rotating said wheels, means for energizing a second group of said heads so as to sequentially register a group of digits as corresponding combinations of polarity reversals in a second group of said rows as said wheels are rotated.

19. A digital memory device such as claimed in claim 18, including a plurality of read-out armatures individually associated with said wheels, combinations of said armatures being mechanically operated responsive to the tractive influence of said polarity reversals in said corresponding combinations of polarity reversals as said rotating means is operated to again rotate said wheels and sequentially present the said rows of spokes opposite said armatures.

20. A digital memory device comprising a cylindrical magnetic storage element, said element having normally magnetized areas arranged in longitudinal rows on the periphery thereof, each of said rows of areas being capable of having an individual digit registered thereon as corresponding combinations of magnetization reversals in accordance with a predetermined code, a plurality of write-in heads, said write-in heads energizable to induce said magnetization reversals in said areas, means for rotating said element, and means for selectively energizing said heads so as to simultaneously register a first group of digits in a first group of said rows of areas, and sequentially register a second group of digits in a second group of said rows of areas as said element is rotated.

21. A digital memory device such as claimed in claim 20, including a plurality of magnetically sensitive armatures associated with said element, combinations of said armatures being operated responsive to the tractive influence of said reversed magnetizations in each of said rows of areas as said rotating means is operated to again rotate said element and sequentially present said first and second groups of said rows opposite said armatures, said normally magnetized areas having no operative effect on said armatures.

22. A memory device comprising a plurality of corotatable wheels, each of said wheels having a plurality of radial spokes, said spokes of each of said wheels arranged in rows with said spokes of others of said wheels, a plurality of write-in heads individually associated with said wheels, a plurality of said rows of spokes being aligned with a first group of said heads, means for selectively energizing said heads in said first group to induce a magnetic flux of one polarity in particular ones of said spokes in said plurality of rows of spokes, means for rotating said wheels to individually present other of said rows of spokes opposite a second group of said heads, means for selectively energizing said second group of heads to successively induce a magnetic flux of said one polarity in particular ones of said spokes in said other group of spokes as said wheels are rotated, a plurality of read-out armatures individually associated with said wheels, said rotating means operated to again rotate said wheels to sequentially present the said rows of spokes opposite said armatures, particular ones of said armatures being mechanically operated responsive to the tractive influence of said induced flux in said particular ones of said spokes of the said rows of spokes.

23. A memory device comprising a cylindrical magnetic storage element, said element having rows of normally magnetized areas on the periphery thereof, a group of write-in heads associated with said areas, means for selectively energizing said heads to induce a flux of opposite polarity in predetermined areas of a group of said rows of areas, a plurality of armatures associated with said areas, said armatures normally repelled by the flux of said normally magnetized areas, said armatures mechanically operable responsive to the tractive influence of the said flux of said opposite polarity, means for rotating said element to sequentially bring the said group of said rows of areas into association with said armatures, particular ones of said armatures operated corresponding to the predetermined areas of the said rows of areas having said flux of said opposite polarity induced thereon.

24. A memory device such as claimed in claim 23, including a second group of write-in heads, and means for selectively energizing said second group of heads to sequentially induce a flux of opposite polarity in predetermined areas of a second group of said rows of areas as said element is rotated.

25. In a magnetic memory device, a magnetizable medium having series of spots thereon, means for magnetizing the spots of each series in different manners to thereby register in code on each series of spots a particular item of information, said last means operative to simultaneously register various items of information and to sequentially register other items of information, a series of read-out devices, each comprising a magnetically movable element, means for bringing said read-out devices into relation with the magnetized spots on said medium, certain of said elements moved when brought into relation with said magnetized spots to thereby read-out the code of the information registered therein.

References Cited in the file of this patent

UNITED STATES PATENTS

| | | |
|---|---|---|
| 2,686,838 | Dehn | Aug. 17, 1954 |
| 2,738,382 | Brooks et al. | Mar. 13, 1956 |
| 2,739,187 | Holden | Mar. 20, 1956 |

UNITED STATES PATENT OFFICE

CERTIFICATE OF CORRECTION

Patent No. 2,872,525 February 3, 1959

Harold J. McCreary

It is hereby certified that error appears in the printed specification of the above numbered patent requiring correction and that the said Letters Patent should read as corrected below.

Column 13, line 28, for "and second group," read -- said second group, --; line 71, for "directory," read -- director, --; column 15, line 37, strike out "each of said leads"; same line, after "rectifiers" insert -- , each of said leads --; line 39, after "group" insert -- by --.

Signed and sealed this 19th day of May 1959.

(SEAL)

Attest:

KARL H. AXLINE
Attesting Officer

ROBERT C. WATSON
Commissioner of Patents